H. DE SMITH.
SAFETY OPERATING MECHANISM.
APPLICATION FILED JULY 28, 1916.
1,280,971.
Patented Oct. 8, 1918.
2 SHEETS—SHEET 1.
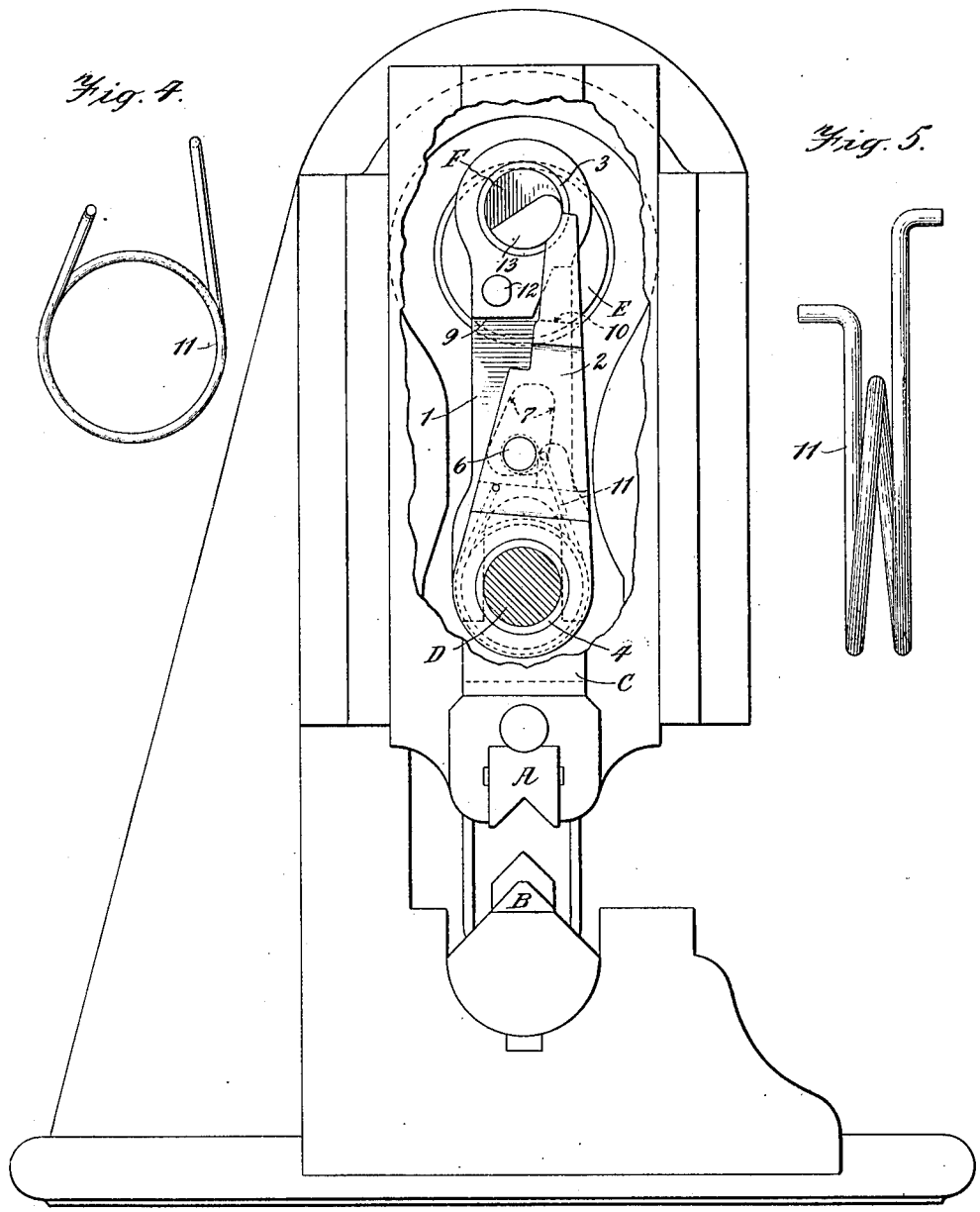

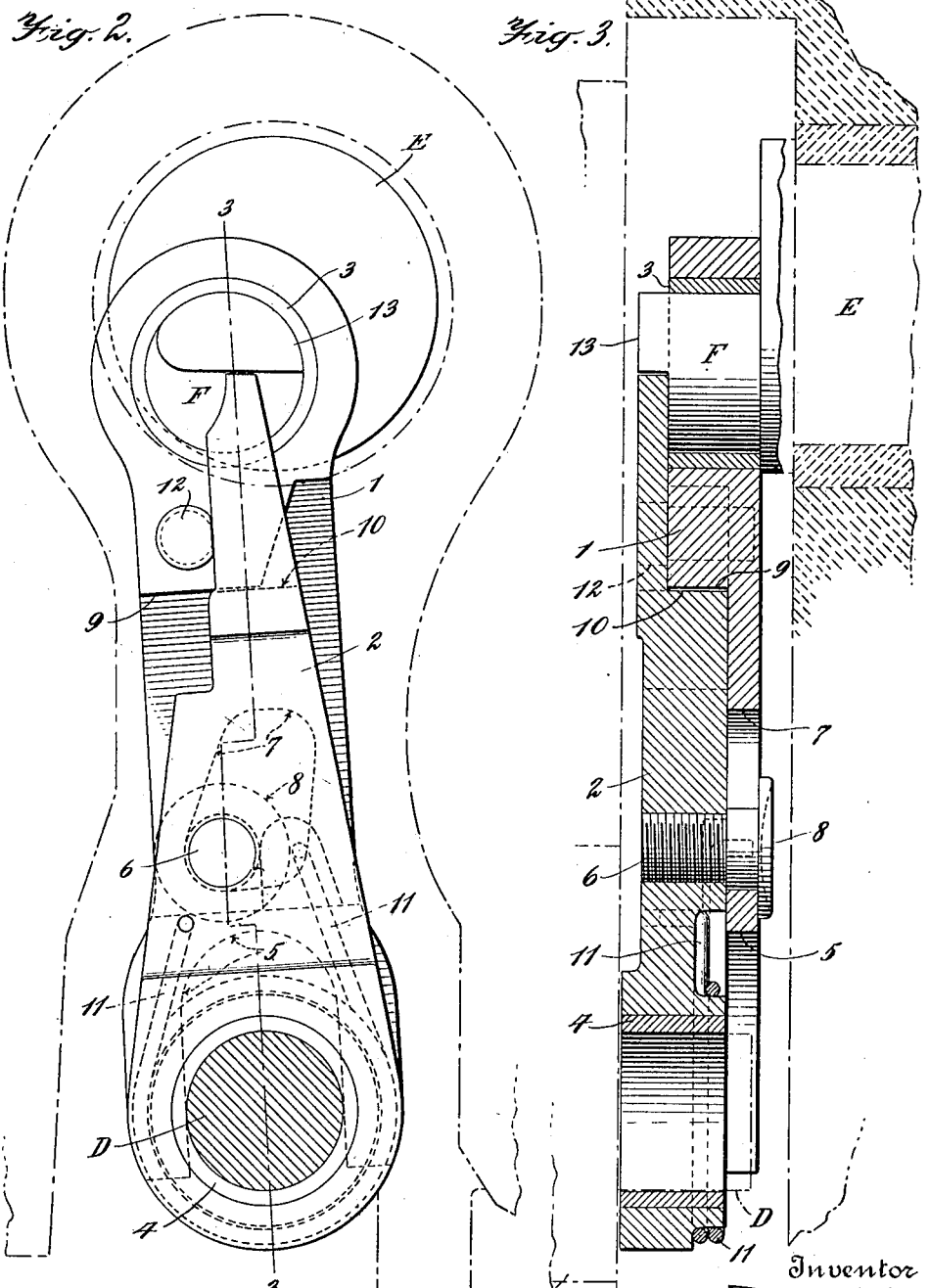

UNITED STATES PATENT OFFICE.

HENRY DE SMITH, OF ROCHESTER, NEW YORK, ASSIGNOR TO M. D. KNOWLTON COMPANY, OF ROCHESTER, NEW YORK, A CORPORATION OF NEW YORK.

SAFETY OPERATING MECHANISM.

1,280,971.   Specification of Letters Patent.   Patented Oct. 8, 1918.

Application filed July 28, 1916.   Serial No. 111,769.

*To all whom it may concern:*

Be it known that I, HENRY DE SMITH, a citizen of the United States, and resident of Rochester, in the county of Monroe and State of New York, have invented certain new and useful Improvements in Safety Operating Mechanism, of which the following is a specification.

The present invention relates to that type of safety devices for presses, punching machines, box staying machines and the like, intended to transmit power from the actuating means to the work-performing element only when the latter is in close proximity to the work to be operated upon. At all other times, the work-performing element will yield if it meets with an obstruction, such as the operator's hand, and, therefore, no harm will be done.

The object of this invention is to provide a safety device or safety operating mechanism of this kind having the improvement hereinafter set forth.

The invention is illustrated in the accompanying drawings, which show the safety operating mechanism applied to a box-staying machine, but it will be obvious that it may be used on other types of machines as well.

In the drawings:—

Figure 1 is a front elevation of a portion of a box staying machine, certain parts being broken away to show the safety operating mechanism;

Fig. 2 is an enlarged view of the safety operating mechanism showing the parts in the position which they assume just prior to the engagement of the work by the work-performing element;

Fig. 3 is a vertical section taken on the line 3—3 of Fig. 2; and

Figs. 4 and 5 are end and side views respectively, of a spring forming part of the safety operating mechanism, the view of the spring in Fig. 5 being on a larger scale than that in Fig. 4.

The box staying machine illustrated in the drawings is of the usual construction, and comprises a movable die A and a stationary die or anvil B. The movable die A is carried by a reciprocating slide C provided with a rearwardly projecting pin D. This pin is connected to and driven by the actuating shaft E, which, in the present instance, is provided with a crank pin F. The crank pin F is connected with the pin D by a link or pitman construction, which is constructed in the manner hereinafter described, to constitute the safety device or safety operating mechanism hereinbefore referred to.

The safety operating mechanism or safety link comprises two power transmitting elements, one of which is indicated at 1, and is journaled on the crank pin F, and the other is shown at 2, and is pivotally connected with the pin D. A bushing 3 may be interposed between the pin F and the part 1, and a similar bushing 4 interposed between the pin D and the part 2.

The depending power transmitting element 1 has a bifurcated lower extremity forming an elongated opening 5, in which the pin D engages and in which it is freely slidable. The parts 1 and 2 are connected by means of a pin 6 secured in the part 2 and engaging in an opening 7 in the part 1, preferably having the shape shown in Fig 2. An enlarged head 8 on the pin 6 overlies the face of the part 1, and serves to hold the parts 1 and 2 together.

The depending power transmitting element 1 is provided with a shoulder 9, which is adapted to engage with a corresponding shoulder 10 formed on the power transmitting element 2. The parts are held in the position shown in Fig. 2, in which the shoulders 9 and 10 are in engaging relation, by means of a spring 11, having one or more convolutions wound around the hub of part 2, and having one of its extremities secured to the part 1 and the other extremity secured to the part 2, so that the part 2 will normally be held in the position shown in Fig. 2. A suitable stop 12 may be provided for limiting the movement of the part 2.

An extension of the pin F is formed into a cam 13, and is so shaped that just after the movable die A leaves the work on the up stroke of the safety link, the part 2 will be shifted to the position shown in Fig. 1, in which the shoulders 9 and 10 are out of engaging relation. The cam 13 holds the part 2 in this position during the up and down stroke of the link until the movable die A, or work-performing element, is about ⅛ of an inch from the work to be operated upon. At this time, the cam assumes the position shown in Fig. 2, and permits the spring 11 to shift the part 2 to the position shown in Fig. 2. The shoulders 9 and 10 are then in engaging relation, and pressure is transmitted from the crank pin F through the parts 1 and 2 to the pin D, the same as if a solid link were provided between the pins F and D.

If the work-performing element, which, in the present instance, is the movable die A, encounters any obstacle during its downward movement, such as the operator's hand, the parts 1 and 2 will yield or move relative to each other, since the pin D and part 2 will be held stationary by the obstacle, and as the shoulders 9 and 10 are not in engaging relation, the part 1 and crank pin F will continue their downward movement without applying any pressure to the work-performing element. The openings 7 and 5 permit this relative movement between the parts 1 and 2, and allow the part 1 to make its downward stroke without affecting the part 2 which is being held stationary by the obstacle under the work-performing element. When an obstacle is so met with, and the parts move relative to each other, as just described, the upper extremity of the part 2 will be thrown to one side of the cam 13, and the cam in descending will move downward relative to the upper end of the part 2, in an obvious manner.

Obviously, any obstruction over ⅛ of an inch in thickness will cause the parts to collapse or move relative to each other, as above described, since the shoulders 9 and 10 are not in engaging relation at any time, until the work-performing element is ⅛ of an inch from the work to be operated upon. When the shoulders 9 and 10 are not in engaging relation, no pressure will be applied to the obstacle under the work-performing element, and, therefore, the operator's hand, if accidentally caught between the dies, will be uninjured.

As hereinbefore described, the link parts 1 and 2 are held with their shoulders 9 and 10 out of engaging relation during the up stroke of the link and also during the down stroke of the same until the die A is about ⅛ of an inch from the work to be operated upon. During such down stroke of the link, the part 1 and 2 may be held against collapsing—such as would occur if the lower part and connecting die A did not move as fast as the upper part and its connecting pin F—by the frictional engagement between the parts obtained by the headed pin or screw 6. It has been found in practice, however, that some other or additional means is desirable for holding the said link parts against collapsing, that will automatically provide for any wear or loosening of the parts. I have therefore provided a means for yieldingly holding the two link parts in such frictional engagement as will suffice to hold them against collapsing during the down stroke and at the same time permit of the described relative sliding movements of the parts in shifting to their operative and inoperative positions. Such means may be any suitable for the purpose, but a preferred means comprises the spring 11 which is here formed with its coiled portion expanding between the adjacent ends of the link parts 1 and 2 to produce the necessary friction between said parts as they slide over one another and under the head of the pin or screw 6 which connects them.

A spring similar to the spring 11 here shown is disclosed in the pending application of Edgar M. Hawkins, Serial No. 862,480, but that spring is formed with tight coils, that is, with the adjacent coils of the wire in contact with one another, this being done because the function of the spring is simply that of normally holding the link parts in their operative position with the shoulders 9 and 10 in engaging relation. The spring 11 here shown, however, is formed with open coils, as shown in Fig. 5. Thus when the link is assembled, these coils are brought under compression sidewise or in a direction parallel to the axis of the coil, whereby they will act to produce the desired friction between the link parts as described. The present spring therefore performs the function of the similar spring of the aforesaid pending application, plus the additional function of preventing collapsing of the link parts.

What I claim is:—

1. In a machine of the kind specified, the combination with the actuating means and the work-performing element, of a safety link connecting the same and comprising two parts normally held in an inoperative position for transmitting power and one being laterally slidable on the other, automatic means for shifting the position of one of the parts to permit said parts to contact and render the same effective for transmitting power just prior to the engagement of the work by the work-performing element, and means yieldingly holding said parts in frictional engagement with each other and against collapsing when in their said inoperative position.

2. In a machine of the kind specified, the combination with the actuating means and the work-performing element, of a safety link connecting the same and comprising two parts normally held in an inoperative position for transmitting power and one being laterally slidable on the other, automatic means for shifting the position of one of the parts to permit said parts to contact and render the same effective for transmitting power just prior to the engagement of the work by the work-performing element, and a spring yieldingly holding said parts in frictional engagement with each other and against collapsing when in their said inoperative position.

3. In a machine of the kind specified, the combination with the actuating means and the work-performing element, of a safety link connecting the same and comprising two parts normally held in an inoperative position for transmitting power and one being laterally slidable on the other, and a spring for shifting the position of one of the parts to permit said parts to contact and render the same effective for transmitting power just prior to the engagement of the work by the work-performing element, said spring being constructed and operative to also yieldingly hold the link parts in frictional engagement with each other and against collapsing when in their said inoperative position.

4. In a machine of the kind specified, the combination with the actuating means and a vertically reciprocating work-performing element, of a safety link connecting the same and comprising two parts provided with shoulders adapted to engage when said parts are in their operative positions and one of said parts being laterally slidable on and relative to the other, and means controlling the lateral movement of said slidable part so that the said shoulders of the parts will automatically engage at a predetermined point during the down stroke of the link and just prior to the engagement of the work by the work-performing element, said controlling means comprising a spring which is constructed and operative to also yieldingly hold the link parts in frictional engagement with each other and against collapsing during the down stroke of the link prior to the engagement of the link shoulders.

Signed at Rochester, in the county of Monroe, and State of New York, this 25th day of July A. D. 1916.

HENRY DE SMITH.

Witnesses:
  THOS. D. PATTON,
  CECIL H. FEARNLEY.

Copies of this patent may be obtained for five cents each, by addressing the "Commissioner of Patents, Washington, D. C."